No. 769,496.

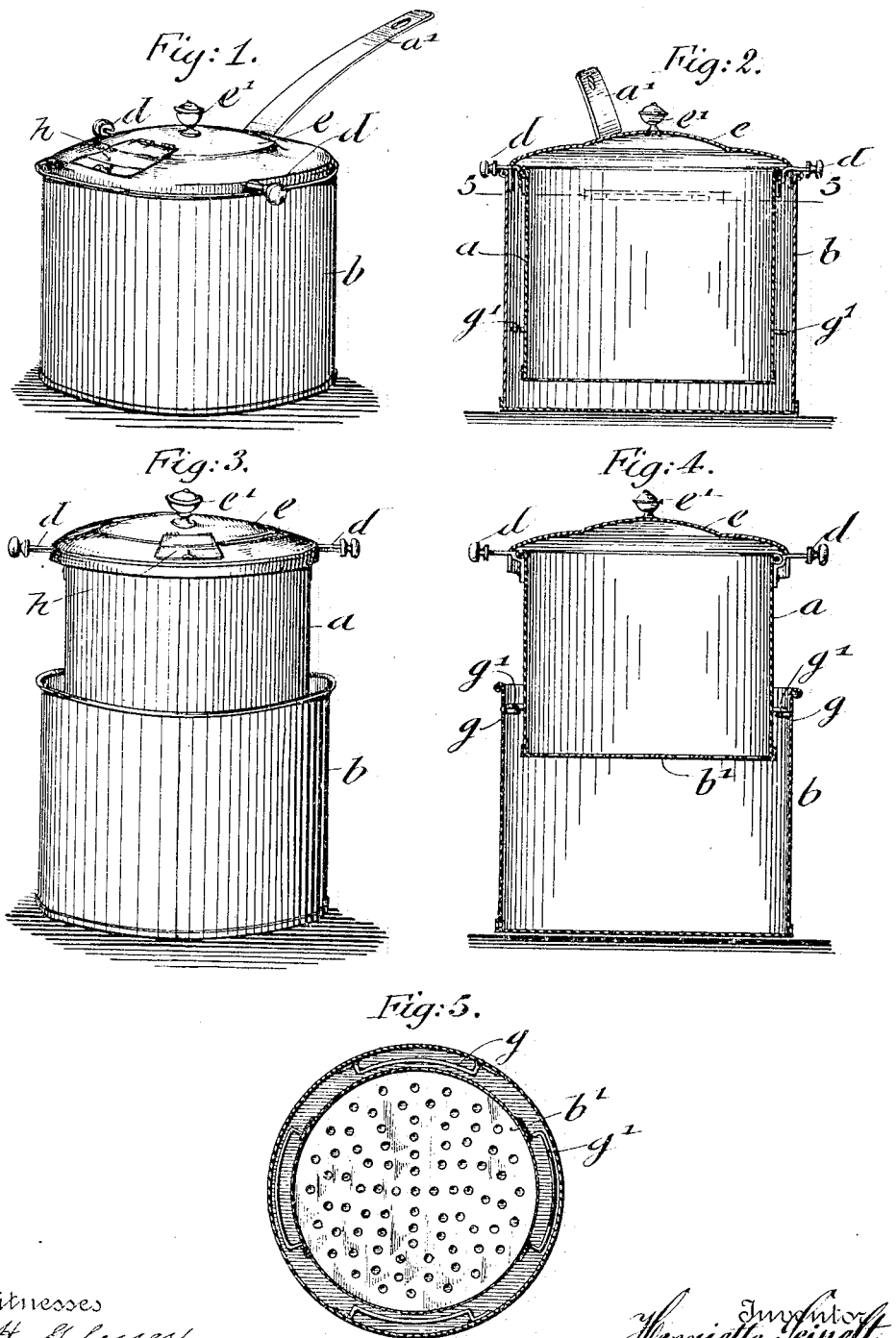

Patented September 6, 1904.

UNITED STATES PATENT OFFICE.

HENRIETTE SEIPELT, OF NEW YORK, N. Y.

CULINARY VESSEL.

SPECIFICATION forming part of Letters Patent No. 769,496, dated September 6, 1904.

Application filed January 12, 1904. Serial No. 188,741. (No model.)

*To all whom it may concern:*

Be it known that I, HENRIETTE SEIPELT, a citizen of the United States, residing in New York, county of Kings, and State of New York, have invented certain new and useful Improvements in Culinary Vessels, of which the following is a specification.

The object of this invention is to furnish for domestic and restaurant purposes an improved culinary vessel which is of special advantage in the boiling of potatoes and other vegetables, the preparing of bouillons and meat extracts, &c., by which the burning of the vegetables or contents of the vessels is entirely avoided and by which the contents are strained before removing them from the vessel.

For this purpose the invention consists of a culinary vessel which is composed of an exterior vessel, an interior vessel provided with handles at the upper end and having a strainer-bottom, the exterior vessel being provided near its upper end at the inner surface with segmental shoulders and the interior vessel with segmental shoulders near its lower end at the outer surface, so that the inner vessel can be supported in raised position in the outer vessel for straining off the liquid from the solid contents of the vessel, and a lid for covering both vessels provided with diametrically opposite recesses where it fits on the shanks of the handle of the inner vessel.

In the accompanying drawings, Figure 1 represents a perspective view of my improved culinary vessel shown in position for use. Fig. 2 is a vertical central section passing through the handles of the interior vessel. Fig. 3 is a perspective view of a vessel, showing the inner vessel in position for straining the contents. Fig. 4 is a vertical central section passing through the handles of the interior vessel, and Fig. 5 is a horizontal section on line 5 5, Fig. 2.

Similar letters of reference indicate corresponding parts.

My improved culinary vessel consists of two parts—an exterior vessel and an interior vessel, which is of somewhat smaller diameter and less height. This interior vessel is provided at diametrically opposite points with wire shanks and handles $d$, of wood or other suitable material which is a non-conductor of heat, so as to permit the lifting of the interior vessel out of the exterior vessel and the lowering of the same into the exterior vessel as required. The wire shanks are preferably made of rectangular or flat cross-section, so as to rest on the rim of the exterior vessel $b$. The interior vessel is provided with a strainer-bottom $b'$, said bottom being either provided with a number of perforations or made of coarse wire-gauze or any other suitable material. Both vessels are covered by a lid $e$, which is provided with a handle $e'$ for removing the same from the vessel. The lid is recessed at diametrically opposite points, so as to fit over the shanks of the handles $d$ of the interior vessel. An opening is provided in the lid, said openig being closed by a hinged cover $h$, so as to permit the inspection of the contents of the interior vessel whenever desired. An ordinary sheet-metal handle $a'$ is attached to the exterior vessel, so as to place the same on or remove it from the stove.

The exterior vessel $b$ is provided at its inner side near its upper end with arc-shaped shoulders $g$, formed of flat wire, said shoulders being riveted, soldered, or otherwise attached to the vessel $b$. The interior vessel $a$ is provided near its lower end with similar arc-shaped projecting shoulders $g'$, also formed of wire, that are attached to the outer side of the vessel, said shoulders $g$ and $g'$ being arranged at diametrically opposite points of said vessels, so as to permit the interior vessel to be lifted within the exterior vessel until its shoulders $g'$ are higher than the shoulders at the inner side of the exterior vessel, then turned on its axis, and supported within the exterior vessel by said shoulders $g'$ resting on the shoulders $g$ of the exterior vessel, as shown in Fig. 4. This permits the straining of the liquid contents of the interior vessel from the solid contents of the same, so that both can be used separately—the solid contents by removing the interior vessel and then the lid from the same and the strained-off liquid directly from the exterior vessel. This arrangement is of advantage in boiling vegetables, as the same cannot be burned or otherwise injured by the overheating of the vessel or evaporation of the boiling water and that the same can be removed and strained off from the interior vessel after the latter has remained for a few minutes in raised position in the exterior vessel. When boiling vegetables, and more especially potatoes, preparing bouillons, meat-juices, and the like, my improved culinary vessel is readily adapted for the same and will recommend itself for use in domestic and restaurant and hotel kitchens.

Having thus described my invention, I claim as new and desire to secure by Letters Patent—

A culinary vessel, comprising an exterior vessel provided with inwardly-projecting shoulders attached to the sides of the vessel, a smaller interior vessel having a perforated bottom and provided on its outer surface with shoulders similar to the shoulders on the exterior vessel and coöperating therewith for holding the interior vessel in raised position, handles on the interior vessel, a handle on the exterior vessel, and a lid for covering both vessels, said lid having a flanged rim adapted to rest in contact with the inner surface of said exterior vessel.

In testimony that I claim the foregoing as my invention I have signed my name in presence of two subscribing witnesses.

HENRIETTE SEIPELT.

Witnesses:
PAUL GOEPEL,
HENRY J. SUHRBIER.